(12) United States Patent
Chen et al.

(10) Patent No.: US 6,616,565 B1
(45) Date of Patent: Sep. 9, 2003

(54) DIFFERENTIAL GEAR DESIGNED FOR USE IN LIGHT-DUTY MOTOR VEHICLES

(76) Inventors: Yao-Yu Chen, P. O. Box 453, Taichung (TW); Hsueh-Mi Chang, P. O. Box 453, Taichung (TW)

( * ) Notice: Subject to any disclaimer, the term of this patent is extended or adjusted under 35 U.S.C. 154(b) by 0 days.

(21) Appl. No.: 10/100,131

(22) Filed: Mar. 19, 2002

(51) Int. Cl.$^7$ .............................................. F16H 48/06
(52) U.S. Cl. ...................................................... 475/230
(58) Field of Search ................................ 475/230, 231, 475/237, 234, 243

(56) References Cited

U.S. PATENT DOCUMENTS

| | | | | |
|---|---|---|---|---|
| 3,673,889 A | * | 7/1972 | Hauser | 475/230 |
| 3,843,145 A | * | 10/1974 | Templeton | 280/7.15 |
| 4,221,138 A | * | 9/1980 | Stewart et al. | 74/607 |
| 5,788,254 A | * | 8/1998 | Davis | 280/282 |
| 6,125,959 A | * | 10/2000 | Seto et al. | 180/207 |
| 6,354,979 B1 | * | 3/2002 | Lohr | 475/240 |

FOREIGN PATENT DOCUMENTS

GB          2260170 A   *   4/1993   ............. F16H/1/40

* cited by examiner

Primary Examiner—Sherry Estremsky
Assistant Examiner—Tisha D. Lewis

(57) ABSTRACT

A differential gear comprises power input sprocket gear, differential pinion shaft, differential pinion, differential pinion support seat, side support cover, and differential side gear. Two differential pinions and two differential pinion support seats are mounted on the differential pinion shaft. Two differential side gears are engaged at right angle with the differential pinions. When two differential side gears turn synchronously, the differential pinions turn around the power input sprocket gear. When one of two differential side gears is prevented from turning, the differential pinions turn independently of each other to permit a difference in speeds of the differential side gears, thereby enabling the power input sprocket gear to engage in normal power transmission.

1 Claim, 5 Drawing Sheets

DIFFERENTIAL GEAR DESIGNED FOR USE IN LIGHT-DUTY MOTOR VEHICLES

BACKGROUND OF THE INVENTION

1. Field of the Invention

The present invention relates generally to a differential gear, and more particularly to a differential gear which is used in driving axles of a light-duty motor vehicle so as to facilitate the light-duty motor vehicle to make a turn.

2. Description of Related Art

The conventional differential gear comprises a power input ring gear, a differential housing, a differential pinion, a differential pinion shaft, and a differential side gear. The differential housing is the only supporting structure of the conventional differential gear. In other words, the differential housing is provided at one end with a disk like portion for mounting the power input ring gear, and at other end with a spherical hollow body in which the differential pinion, the differential pinion shaft, and the differential side gear are mounted. The conventional differential gear is relatively cumbersome and is therefore unsuitable for use in a light-duty three-wheeled or four-wheeled motor vehicle, such as a motorized vehicle designed for traveling over beach, a motorized vehicle designed for driving by the handicapped, etc. As a result, such light-duty three-wheeled or four-wheeled motor vehicle is not equipped with an appropriate differential gear to enable the motor vehicle to make turns with ease.

BRIEF SUMMARY OF THE INVENTION

The primary objective of the present invention is to provide a differential gear which is light in weight and small in volume and is suitable for use in the light-duty three-wheeled or four-wheeled motor vehicle.

The differential gear of the present invention comprises a power input sprocket gear, a differential pinion shaft, a differential pinion, a differential pinion support seat, a side support cover, and a differential side gear. Two differential pinions and two differential pinion support seats are mounted on the differential pinion shaft, whereas two differential side gears are held by two side support covers such that the differential side gears are engaged at right angle with the differential pinions. As two differential side gears turn synchronously, the two differential pinions turn around the power input sprocket gear. When one of the two differential side gears is prevented from turning by an external factor, the two differential pinions turn independently of each other to permit a difference in speeds of the differential side gears, thereby enabling the power input sprocket gear to engage in the normal power transmission.

The features and the advantages of the present invention will be more readily understood upon a thoughtful deliberation of the following detailed description of the present invention with reference to the accompanying drawings.

BRIEF DESCIPTION OF THE SEVERAL VIEWS OF THE DRAWINGS

DETAILED DESCRIPTION OF THE INVENTION

Figure 1:
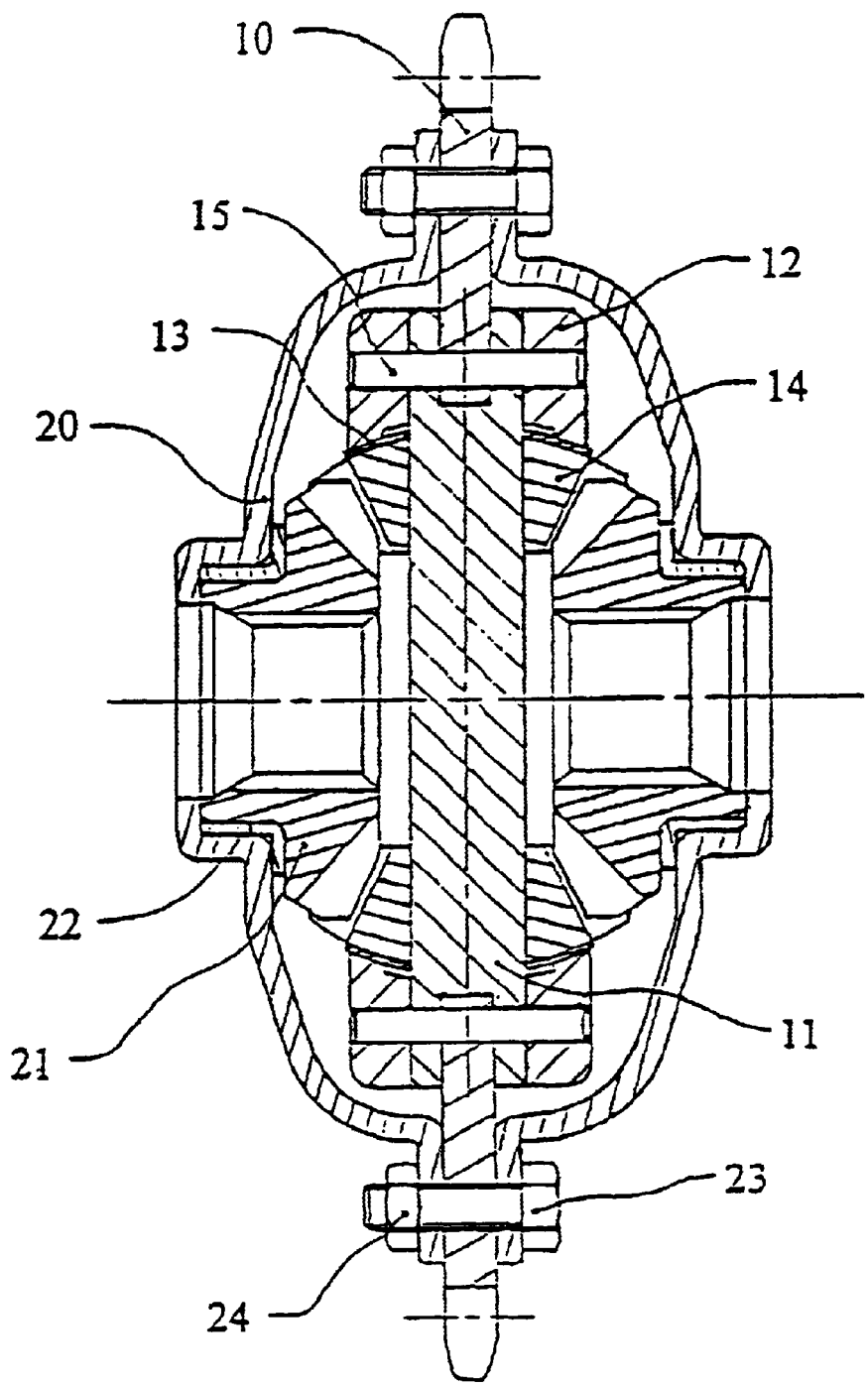
FIG. 1 shows a sectional schematic view of a preferred embodiment of the present invention.

As shown in FIG. 1, the present invention comprises a power input sprocket gear 10, a differential pinion shaft 11, a differential pinion support seat 12, a washer 13, a differential pinion 14, a locating pin 15, a side support cover 20, a differential side gear 21, a shaft liner 22, a bolt 23, and a nut 24.

Figure 2:
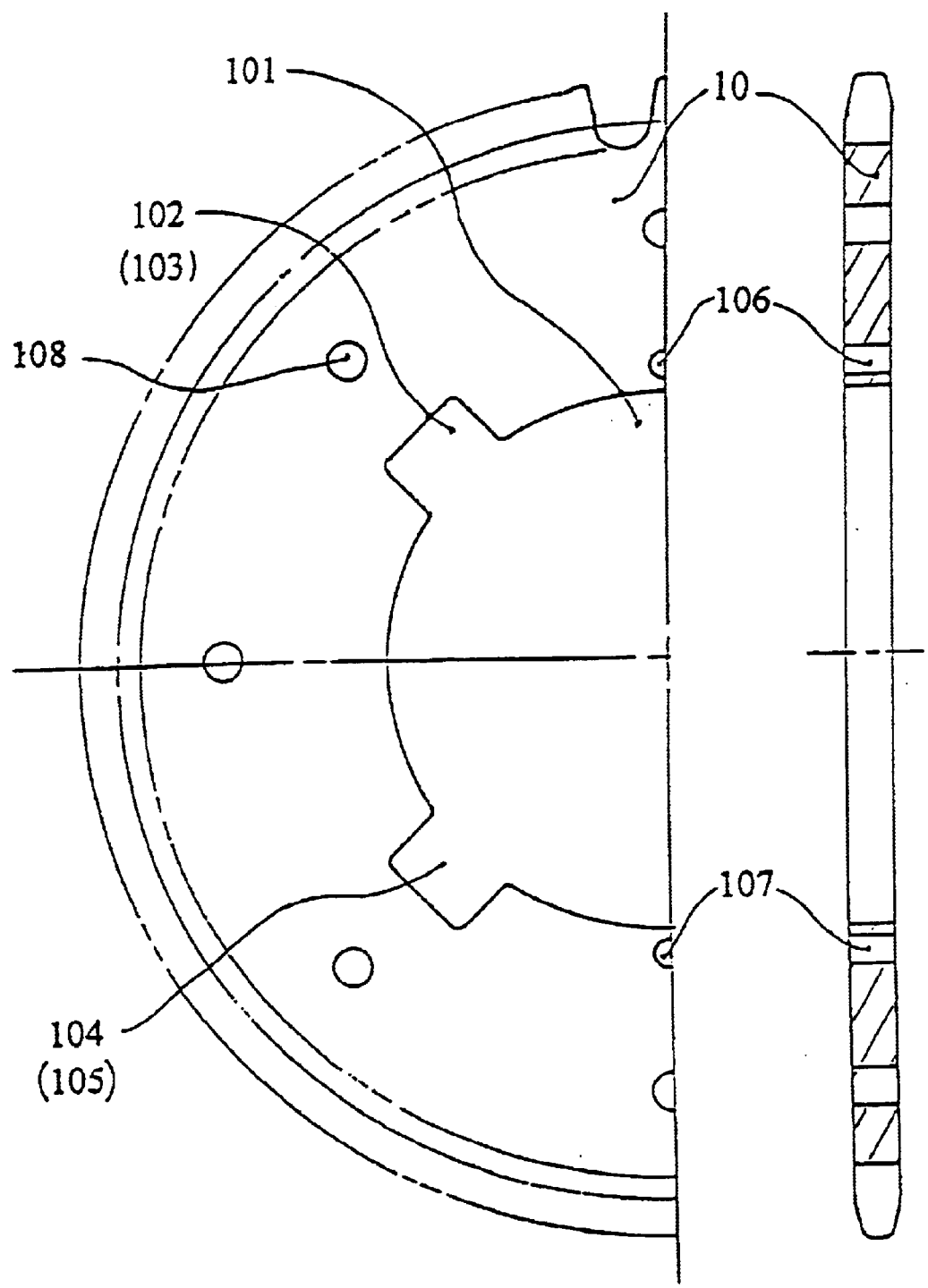
FIG. 2 shows a plan view an a sectional view of a power input sprocket gear of the preferred embodiment of the present invention.

As shown in FIG. 2, the power input sprocket gear 10 is provided in the center of the disk thereof with a through hole 101, which is provided in the arcuate side edge thereof with a plurality of recesses 102, 103, 104, 105. Located between the recesses 102, 103, and 104, 105 are through holes 106, 107, which are equiangularly arranged for locating the differential pinion shaft 11 on which two differential pinion support seats 12, two washers 13, and two differential pinions 14 are mounted in conjunction with the locating pins 15 which are fastened in the through holes 106, 107. The differential pinion support seats 12 and the power input sprocket gear 10 are partially welded. The power input sprocket gear 10 is further provided in the disk thereof with eight through holes 108 for fastening two side support covers 20 by the bolts 23 and the nuts 24.

Figure 3:
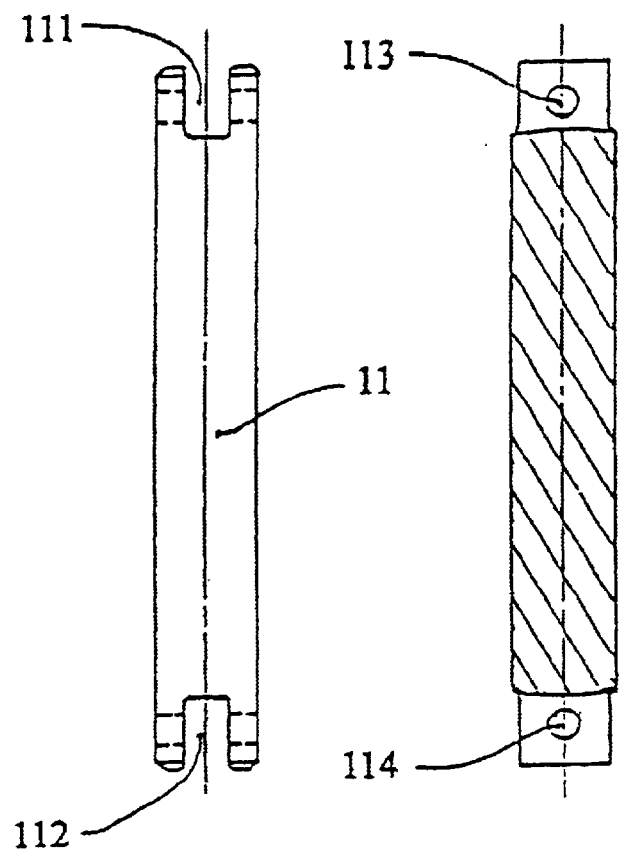
FIG. 3 shows a plan view and a sectional view of a differential pinion shaft of the preferred embodiment of the present invention.

As shown in FIG. 3, the differential pinion shaft 11 is provided at two longitudinal ends with a slot 111, 112. The slots 111 and 112 are provided on the axial center line of the right angle moment with a through hole 113, 114 for the locating pins 15 to be located in the through holes 106, 107 of the power input sprocket gear 10 via the differential pinion support seat 12.

Figure 4:
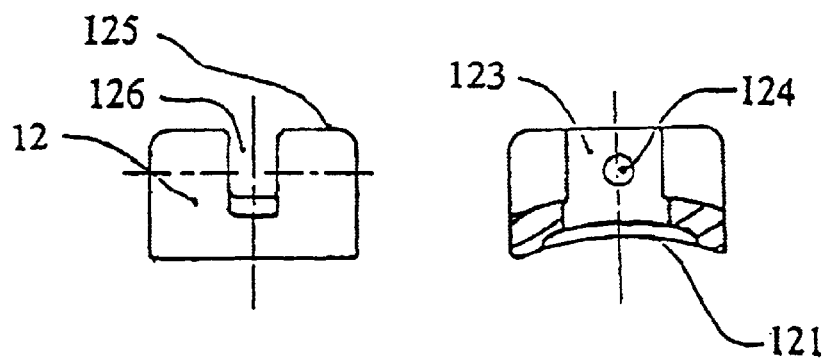
FIG. 4 shows a plan view and a sectional view of a differential pinion support seat of the preferred embodiment of the present invention.

As shown in FIG. 4, the differential pinion support seat 12 is provided at one longitudinal end thereof with a circular planar surface 125 which is in turn provided at the center with a depression 126. The depression 126 is provided at the right angle moment with a through hole 124 for locating the locating pin 15. The reverse end of the differential pinion support seat 12 is provided with a two-stepped spherical recess 121 for supporting and locating the differential pinion 14 such that the differential pinion 14 can revolve freely and independently. The reverse end of the differential pinion support seat 12 is provided in the axial center with a through hole 123 for disposing the differential pinion shaft 11. The washer 13 is of a semispherical construction and is disposed between the differential pinion support seat 12 and the differential pinion 14 which is a sector gear and is provided with a through hole for receiving the differential pinion shaft 11.

Figure 5:
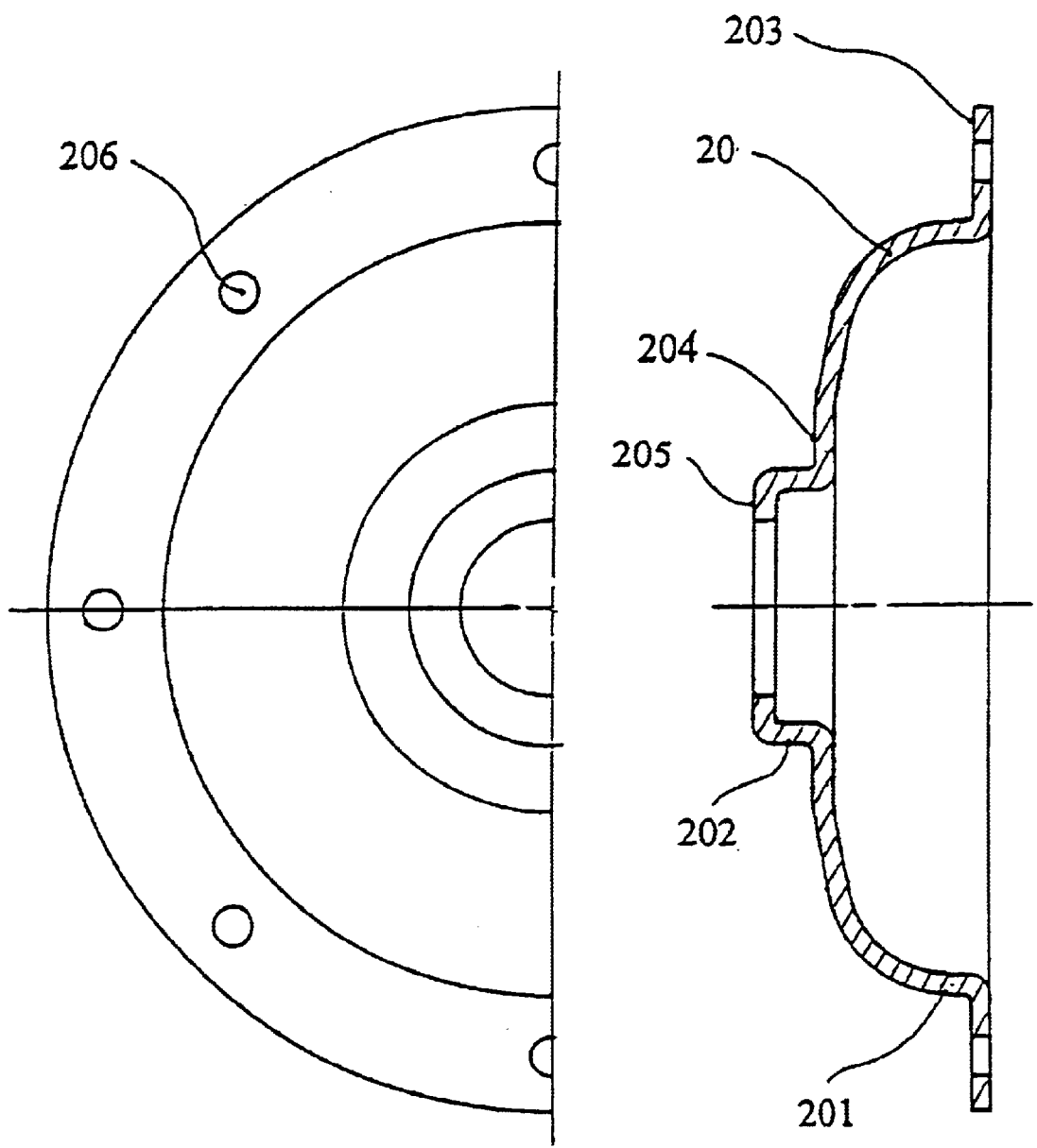
FIG. 5 shows a plan view and a sectional view of a side support cover of the preferred embodiment of the present invention.
Figure 6:
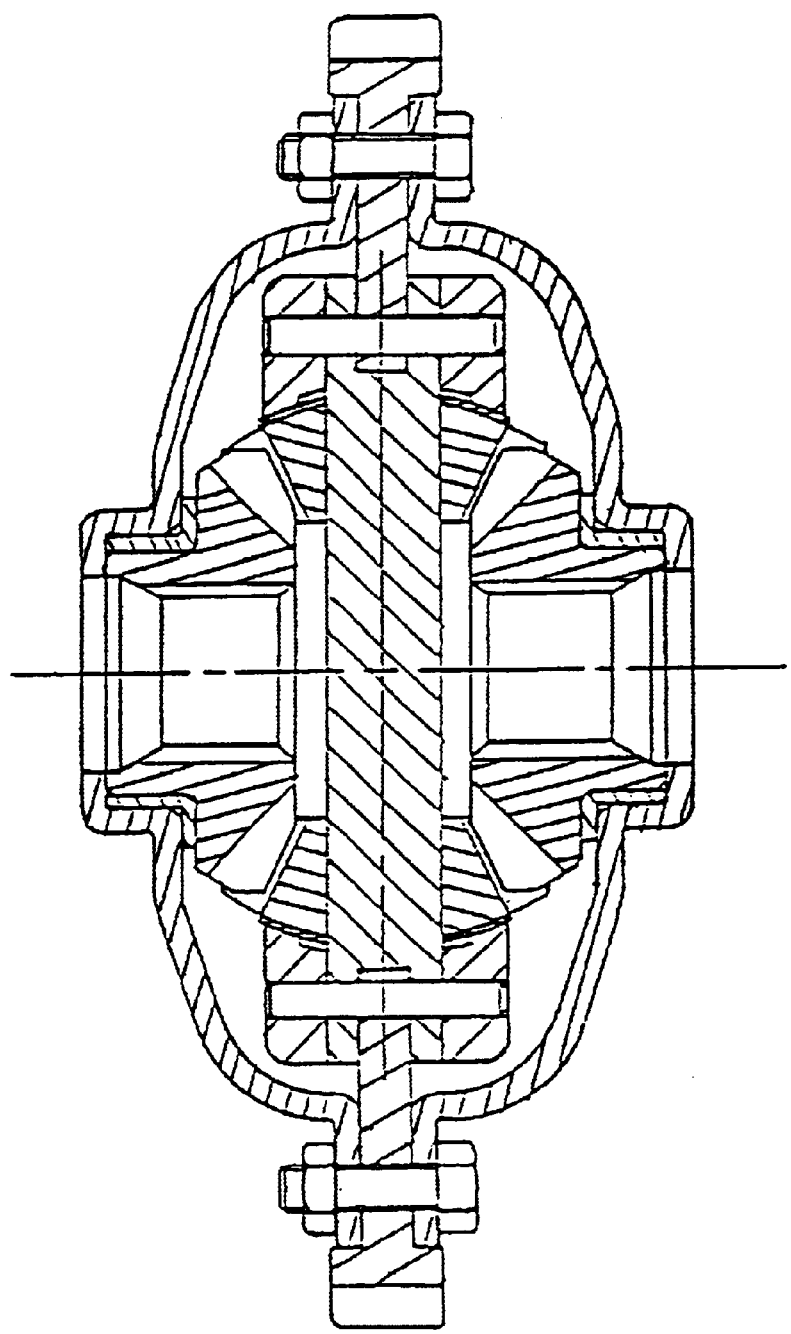
FIG. 6 shows a sectional schematic view of another preferred embodiment of the present invention.

Now referring to FIG. 5, the side support cover 20 is provided with two axially-oriented differential circles 201 and 202, and three radially-oriented disk surfaces 203, 204, and 205, which are intended to mount and support the differential side gear 21 and the shaft liner 22. The disk surface 203 is provided with eight through holes 206 for receiving the bolts 23. The differential side gear 21 is slightly greater than the differential pinion 14 with which the differential side gear 21 is engaged at right angle. The differential side gear 21 is provided with a cylindrical end for fastening an axle.

The present invention is relatively simple in construction, light in weight, and small in volume. The present invention is suitable for use in a light-duty, three-wheeled or four-wheeled motor vehicle. In addition, the two side support covers 20 and the power input sprocket gear 10 are fastened together by a plurality of bolts and nuts, thereby making the assembly of the present invention easy.

I claim:

1. A differential gear for use in a light-duty motor vehicle, said differential gear comprising power input sprocket gear, differential pinion shaft, differential pinion support seat, washer, differential pinion, locating pin, side support cover, differential side gear, shaft liner, bolt, and nut;

wherein said power input sprocket gear is provided with a center through hole which is in turn provided in an arcuate side edge thereof with a plurality of recesses and through holes which are equiangularly arranged for locating said differential pinion shaft on which two of said differential pinion support seats, two of said washers, and two of said differential pinions are mounted in conjunction with said locating pin, said power input sprocket gear further provided with eight fastening holes for fastening two of said side support covers by a plurality of said bolts and said nuts;

wherein said differential pinion shaft is provided at two longitudinal ends with a slot which is provided in an axial center line of a right angle moment with a through hole for locating said locating pin which is also located in said through hole of said power input sprocket gear;

wherein said differential pinion support seat is provided at one longitudinal end with a circular planar surface which is in turn provided at a center thereof with a depression, said depression being provided at a right angle moment with a through hole for locating said locating pin, said differential pinion support seat further provided at a reverse end thereof with a two-stepped spherical recess for supporting and locating said differential pinions such that said differential pinions can revolve freely and independently, said differential pinion support seat further provided at the reverse end thereof with a through hole for disposing said differential pinion shaft;

wherein said side support cover is provided with two axially-oriented differential circles and three radially-oriented disk surfaces for mounting and supporting said differential side gear and said shaft liner, an outermost disk surface of said disk surfaces being provided with eight through holes for receiving said bolts by which said side support cover is fastened with said power input sprocket gear;

wherein said differential side gear is greater in size than said differential pinion and is engaged with said differential pinion at right angle, said differential side gear being provided with a cylindrical end for fastening an axle.

* * * * *